US007122166B2

(12) United States Patent
Parrish

(10) Patent No.: US 7,122,166 B2
(45) Date of Patent: Oct. 17, 2006

(54) CONCENTRATION OF HYDROGEN PEROXIDE

(75) Inventor: Clyde F. Parrish, Melbourne, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 413 days.

(21) Appl. No.: 10/845,607

(22) Filed: May 11, 2004

(65) Prior Publication Data

US 2005/0252856 A1 Nov. 17, 2005

(51) Int. Cl.
*C01B 15/013* (2006.01)
(52) U.S. Cl. .................. 423/584; 210/634; 210/640; 210/649
(58) Field of Classification Search .............. 423/584; 210/634, 640, 649
See application file for complete search history.

(56) References Cited

U.S. PATENT DOCUMENTS

| 5,662,878 A | * | 9/1997 | Datta et al. | 423/588 |
| 5,800,796 A | * | 9/1998 | Webb et al. | 423/584 |
| 5,851,402 A | * | 12/1998 | Dhalluin et al. | 210/651 |
| 6,783,748 B1 | * | 8/2004 | Tanaka et al. | 423/584 |
| 2003/0086853 A1 | * | 5/2003 | Devic | 423/272 |
| 2004/0018143 A1 | * | 1/2004 | Zhou et al. | 423/584 |

FOREIGN PATENT DOCUMENTS

| JP | 58-163489 | * | 9/1983 | 210/634 |

* cited by examiner

*Primary Examiner*—Wayne A. Langel
(74) *Attorney, Agent, or Firm*—Randall M. Heald

(57) ABSTRACT

Methods for concentrating hydrogen peroxide solutions have been described. The methods utilize a polymeric membrane separating a hydrogen peroxide solution from a sweep gas or permeate. The membrane is selective to the permeability of water over the permeability of hydrogen peroxide, thereby facilitating the concentration of the hydrogen peroxide solution through the transport of water through the membrane to the permeate. By utilizing methods in accordance with the invention, hydrogen peroxide solutions of up to 85% by volume or higher may be generated at a point of use without storing substantial quantities of the highly-concentrated solutions and without requiring temperatures that would produce explosive mixtures of hydrogen peroxide vapors.

20 Claims, 2 Drawing Sheets

CONCENTRATION OF HYDROGEN PEROXIDE

STATEMENT OF GOVERNMENT INTEREST

The invention described herein was made by an employee of the United States Government and may be manufactured and used by or for the Government of the United States of America for governmental purposes without the payment of any royalties thereon or therefor.

TECHNICAL FIELD OF THE INVENTION

The present invention relates generally to continuous concentration of hydrogen peroxide solutions in particular to the concentration of hydrogen peroxide solutions to levels beyond standard industrial grades.

BACKGROUND OF THE INVENTION

Hydrogen peroxide ($H_2O_2$) is a highly effective oxidizer. Its effectiveness generally increases at increasing concentrations. However, hydrogen peroxide solutions also become increasingly unstable at higher concentrations. For industrial applications, aqueous hydrogen peroxide solutions are generally stored at concentrations of 50% or less by volume. Although hydrogen peroxide solutions may be safely stored at higher concentrations, storage conditions become increasingly critical.

Many industrial applications demand concentrations above 50% by volume. Although generally unsuitable for industrial storage, concentrations of approximately 80% by volume may be attained by heating the solution to 140° C. However, the rate of decomposition of the aqueous solution increases by a factor of approximately 2.3 for each 10° C. increase in temperature. Additionally, at temperatures corresponding to the boiling point of a hydrogen peroxide solution having a concentration of approximately 72% by volume, the vapor pressure of the hydrogen peroxide produces an explosive mixture.

For the reasons stated above, and for other reasons stated below that will become apparent to those skilled in the art upon reading and understanding the present specification, there is a need in the art for alternative methods and apparatus for concentrating hydrogen peroxide solutions at reduced risk of decomposition and hazard.

SUMMARY

Water is removed from aqueous hydrogen peroxide solutions utilizing a membrane preferentially permeable to water vapor over hydrogen peroxide.

For one embodiment, aqueous hydrogen peroxide is separated from a dry gas, such as air or an inert carrier, by a membrane. The membrane is selective to water permeation, thereby allowing water to pass through the membrane and be taken up as vapor by the dry gas. As water vapor is taken up by the dry gas, the concentration of the hydrogen peroxide solution is increased. The process is generally preferred to be continuous in order to avoid producing substantial quantities of highly-concentrated hydrogen peroxide, but there is no preclusion to performing the process in a batch mode. The process is further generally preferred to be a countercurrent continuous process. Concentrations in excess of 80% by volume have been demonstrated at temperatures of less than about 50° C. Unless otherwise noted, concentration percentages are on a volume basis.

The invention further includes methods of varying scope.

DETAILED DESCRIPTION OF THE INVENTION

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and chemical changes may be made without departing from the spirit and scope of the present invention. It is noted that the drawings are not to scale unless a scale is provided thereon. The following detailed description is, therefore, not to be taken in a limiting sense, and the scope of the present invention is defined only by the appended claims and equivalents thereof.

Figure 1:
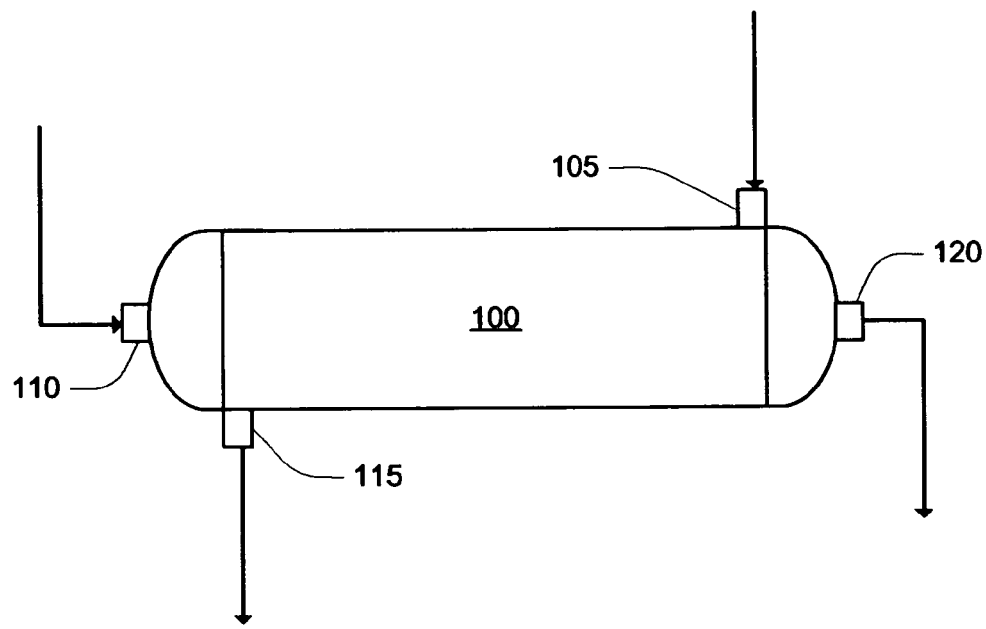
FIG. 1 is a schematic of a hydrogen peroxide concentrator in accordance with an embodiment of the invention.

FIG. 1 is a schematic of a hydrogen peroxide concentrator 100 in accordance with an embodiment of the invention. A hydrogen peroxide feed solution is fed to a first inlet 105 of the concentrator 100 while a sweep gas is fed to a second inlet 110 of the concentrator 100. The concentrator 100 includes a membrane (not shown in FIG. 1) separating the hydrogen peroxide feed solution from the sweep gas. The hydrogen peroxide feed solution and the sweep gas are preferably run countercurrent through the concentrator 100, but could also be run in a concurrent fashion.

As the hydrogen peroxide solution and the sweep gas flow through the concentrator 100, water permeates the membrane from the hydrogen peroxide solution and is taken up by the sweep gas, thereby producing a concentrated hydrogen peroxide solution and a wet exit gas. The concentrated hydrogen peroxide solution exits the concentrator 100 through a first outlet 115 while the wet exit gas exits the concentrator 100 through a second outlet 120.

Figure 2:
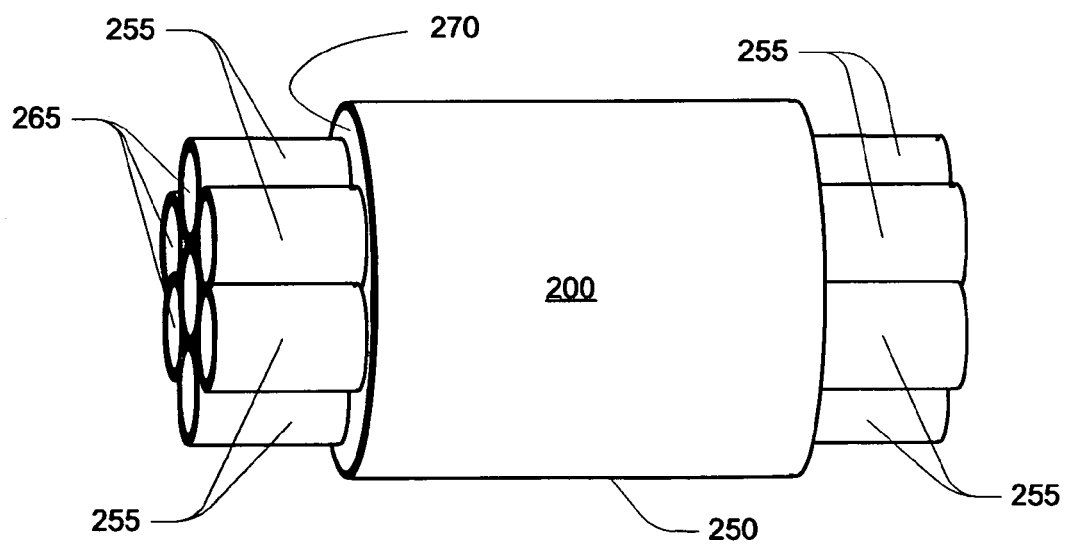
FIG. 2 is a cut-away view of a concentrator in accordance with an embodiment of the invention.

FIG. 2 is a cut-away view of a concentrator 200 in accordance with an embodiment of the invention. The concentrator 200 includes an outer shell 250 containing the membrane 255, shown in FIG. 2 using a hollow-fiber construction. The hydrogen peroxide solution 270 is separated from the sweep gas 265 by the membrane 255. For the embodiment depicted in FIG. 2, the sweep gas 265 or permeate runs on the inside of membrane 255 while the hydrogen peroxide solution 270 or feed runs between the outer shell 250 and the membrane 255. Other configurations, such as spiral-wound flat sheet or parallel-plate constructions may also be used provided that separate flow channels are provided for the sweep gas and the hydrogen peroxide solution. Such separator configurations are well known and will not be detailed herein.

The operation of the hydrogen peroxide concentrator in accordance with the invention is based on the permeability of water as compared with hydrogen peroxide through polymeric membranes. Although not essential, there are three important factors to consider when selecting a membrane for this application:
1. The membrane and all of the wetted components should be non-reactive with high concentrations of hydrogen peroxide. For example, if an 85% solution is desired, the wetted components must be non-reactive with an 85% solution of hydrogen peroxide.
2. The flux of water through the membrane should generally be high in order to reduce the total membrane area required for efficient removal of water.
3. The selectivity, which is the ratio of the permeability of water over the permeability of hydrogen peroxide, is preferably greater than two.

Examples of suitable membranes include polysulfone as well as perfluorinated polymers having sulfonic or carboxylic ionic functional groups. A specific example includes NAFION® brand of perfluorosulfonic acid/TFE copolymer available from E.I. DuPont de Nemours, Wilmington, Del., USA. NAFION® polymer has excellent chemical stability while at the same time allowing ion transport. NAFION® polymer includes sodium or potassium salts of either tetrafluoroethylene/perfluoro (4-methyl-3,6-dioxa-7-octene-1-sulfonic acid) copolymer or tetrafluoroethylene/perfluoro (4-methyl-3,6-dioxa-7-octene-1-sulfonyl fluoride) copolymer. NAFION® polymer has been commonly used for gas drying and humidifying operations as well as ion exchange systems such as fuel cells.

Various embodiments utilize air to transport the water vapor from the hydrogen peroxide solution, but other carrier gases may also be used, such as nitrogen or any other non-reactive gas. Since the capacity of the dry air to retain water is a function of temperature, several temperatures were examined. The results of this testing are summarized in Table 1. As can be seen, as the temperature increases for both membranes, the final concentration of hydrogen peroxide increases. These increases in concentration are primarily the result of the increased capacity of the sweep air when heated. It would be expected that an increase in temperature would extract more water from the hydrogen peroxide solution up to the boiling point of water, e.g., 100° C. at atmospheric pressure.

TABLE 1

The Concentration of Hydrogen Peroxide at Various Air Temperatures of the Permeate Sweep Gas at Atmospheric Pressure

| Membrane Material | Temperature | Initial Concentration | Final Concentration |
|---|---|---|---|
| NAFION ® | 19° C. | 67.6% | 75.7% |
| | 42° C. | 69.6% | 81.4% |
| | 50° C. | 69.6% | 85.4% |
| Polysulfone | 20° C. | 69.5% | 72.7% |
| | 23° C. | 69.5% | 75.8% |

Another factor that increases the rate of water removal, and the concentration of the hydrogen peroxide, is the flow rate of the sweep gas. At any given temperature, doubling the flow rate of the sweep air will approximately double the rate of concentration increase.

The calculated selectivity of the NAFION® polymer membrane for water over hydrogen peroxide is 2.4 when the sweep gas temperature is 50° C. The selectivity of the polysulfone membrane was not calculated. However, the water flux through the polysulfone membrane is lower than the NAFION® polymer membrane, which means that the polysulfone membrane will require a larger surface area.

Figure 3:
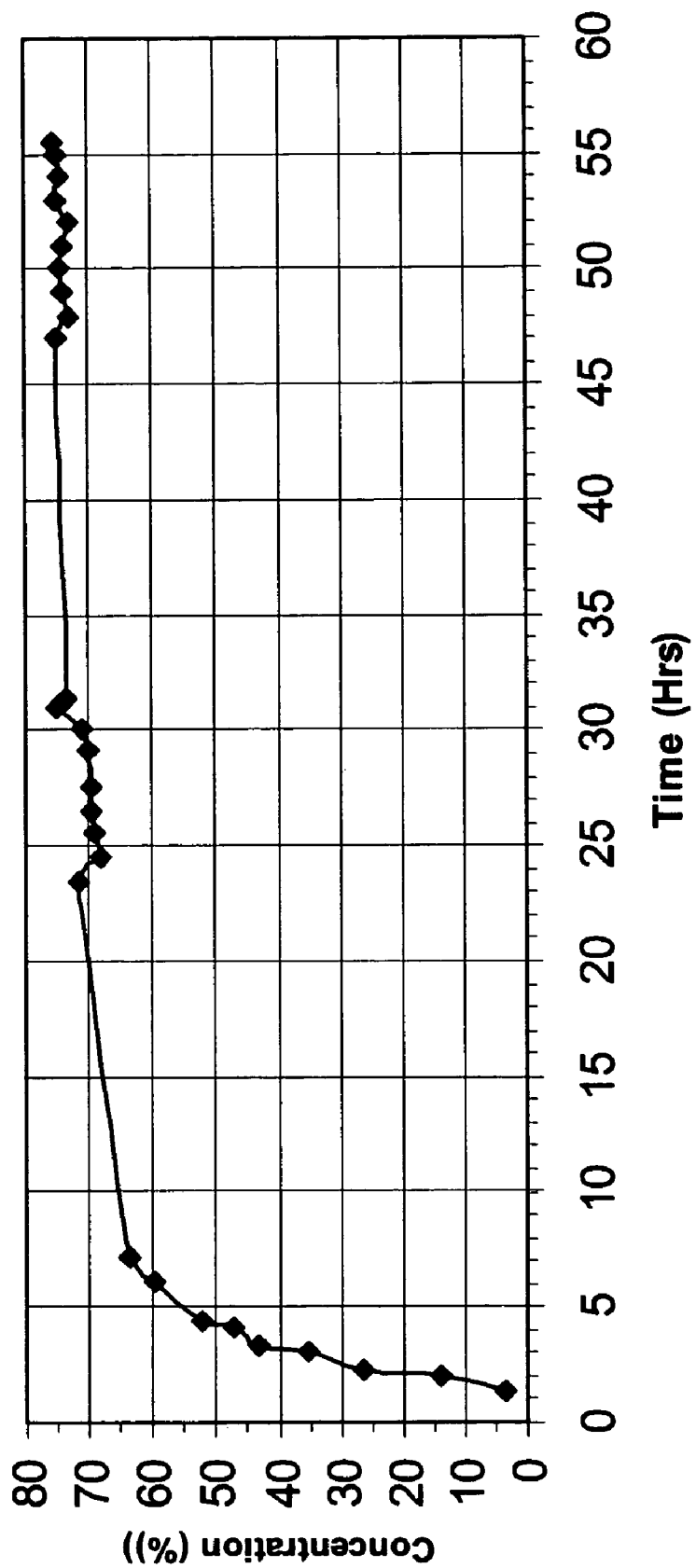
FIG. 3 is a graph showing concentration of hydrogen peroxide versus time for one trial in accordance with an embodiment of the invention.

For fixed flow rates of the hydrogen peroxide and sweep air, the concentration of the hydrogen peroxide will reach a constant value regardless of the initial concentration. This is illustrated in FIG. 3 where the concentrator contained water at the start of the test and the initial concentration of the hydrogen peroxide was 69.5%. As the feed rate continued, the concentration of hydrogen peroxide leveled at approximately 76 percent at ambient temperatures.

The temperature of the incoming sweep gas during trials ranged from 18 to 50° C. It is expected that increased temperatures, e.g., 75° C., would improve the efficiency of the concentrator without affecting the structural integrity of the chosen membrane. Due to the explosive potential of highly-concentrated hydrogen peroxide solutions, it is recommended that the temperature of the system be maintained below the boiling point of a 72% hydrogen peroxide solution.

While the various trials were performed at ambient pressures on the permeate side, lower pressures would accelerate the process by increasing the pressure differential across the membrane. By utilizing a suitable membrane support structure, it is expected that pressure differentials of 100 psi or more could be maintained through increasing pressure on the feed side and/or decreasing pressure on the permeate side. Additionally, it is expected that the introduction of turbulence, e.g., through the use of baffles on one or both sides of the membrane, would improve the transport rates.

The required membrane area is dependent on the desired production rate and the permeability of the membrane. For the NAFION® polymer membrane, an area of about 600 sq ft is expected to be required to concentrate 1 gal per hour of hydrogen peroxide to 85 percent.

CONCLUSION

Methods for concentrating hydrogen peroxide solutions have been described. The methods utilize a polymeric membrane separating a hydrogen peroxide solution from a sweep gas or permeate. The membrane is selective to the permeability of water over the permeability of hydrogen peroxide, thereby facilitating the concentration of the hydrogen peroxide solution through the transport of water through the membrane to the permeate. By utilizing methods in accordance with the invention, hydrogen peroxide solutions of up to 85% by volume or higher may be generated at a point of use without storing substantial quantities of the highly-concentrated solutions and without requiring temperatures that would produce explosive mixtures of hydrogen peroxide vapors.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. Therefore, it is manifestly intended that this invention be limited only by the claims and the equivalents thereof

What is claimed is:
1. A method of concentrating an aqueous hydrogen peroxide solution, comprising:
 passing the aqueous hydrogen peroxide solution on a first side of a membrane; and
 passing a sweep gas on a second side of the membrane; wherein the membrane is selective to the permeability of water over the permeability of hydrogen peroxide.

2. The method of claim 1, wherein a ratio of the permeability of water over the permeability of hydrogen peroxide through the membrane is greater than one.

3. The method of claim 1, wherein a ratio of the permeability of water over the permeability of hydrogen peroxide through the membrane is greater than two.

4. The method of claim 1, wherein the membrane comprises a material selected from the group consisting of polysulfone and a perfluorinated polymer having sulfonic or carboxylic ionic functional groups.

5. The method of claim 1, wherein the membrane comprises a material selected from the group consisting of a sodium salt of tetrafluoroethylene/perfluoro (4-methyl-3,6-dioxa-7-octene-1-sulfonic acid) copolymer, a potassium salt of tetrafluoroethylene/perfluoro (4-methyl-3,6-dioxa-7-octene-1-sulfonic acid) copolymer, a sodium salt of tetrafluoroethylene/perfluoro (4-methyl-3,6-dioxa-7-octene-1-sulfonyl fluoride) copolymer and a potassium salt of tetrafluoroethylene/perfluoro (4-methyl-3,6-dioxa-7-octene-1-sulfonyl fluoride) copolymer.

6. The method of claim 1, wherein the sweep gas is air.

7. The method of claim 1, wherein the sweep gas is maintained at a temperature of 100° C. or less.

8. The method of claim 1, wherein the sweep gas is air maintained at a temperature of approximately 20° C. to 75° C.

9. The method of claim 1, wherein the sweep gas is a gas that is non-reactive to the membrane.

10. A method of concentrating an aqueous hydrogen peroxide solution, comprising:
    passing the aqueous hydrogen peroxide solution on a first side of a membrane;
    passing a sweep gas on a second side of the membrane; and
    transporting a sufficient amount of water from the aqueous hydrogen peroxide solution through the membrane to increase a concentration of the aqueous hydrogen peroxide solution to a level in excess of 70% by volume.

11. The method of claim 10, further comprising:
    transporting a sufficient amount of water from the aqueous hydrogen peroxide solution through the membrane to increase the concentration of the aqueous hydrogen peroxide solution to a level in excess of 80% by volume.

12. The method of claim 11, further comprising:
    transporting a sufficient amount of water from the aqueous hydrogen peroxide solution through the membrane to increase the concentration of the aqueous hydrogen peroxide solution to at least 85% by volume.

13. A method of concentrating an aqueous hydrogen peroxide solution, comprising:
    feeding the aqueous hydrogen peroxide solution to a first inlet of a concentrator having a membrane to separate the aqueous hydrogen peroxide solution from a sweep gas, the hydrogen peroxide solution having an initial concentration of less than 70% by volume;
    feeding the sweep gas to a second inlet of the concentrator, wherein a pressure of the sweep gas is less than a pressure of the aqueous hydrogen peroxide solution and a pressure differential across the membrane is approximately 100 psi or less;
    transporting water from the aqueous hydrogen peroxide solution through the membrane to be taken up by the sweep gas, thereby generating a wet sweep gas;
    removing a concentrated aqueous hydrogen peroxide solution from a first outlet of the concentrator; and
    removing the wet sweep gas from a second outlet of the concentrator.

14. The method of claim 13, wherein a ratio of the permeability of water over the permeability of hydrogen peroxide through the membrane is greater than two.

15. The method of claim 13, wherein the membrane comprises a material selected from the group consisting of polysulfone and a perfluorinated polymer having sulfonic or carboxylic ionic functional groups.

16. The method of claim 13, wherein the membrane comprises a material selected from the group consisting of a sodium salt of tetrafluoroethylene/perfluoro (4-methyl-3,6-dioxa-7-octene-1-sulfonic acid) copolymer, a potassium salt of tetrafluoroethylene/perfluoro (4-methyl-3,6-dioxa-7-octene-1-sulfonic acid) copolymer, a sodium salt of tetrafluoroethylene/perfluoro (4-methyl-3,6-dioxa-7-octene-1-sulfonyl fluoride) copolymer and a potassium salt of tetrafluoroethylene/perfluoro (4-methyl-3,6-dioxa-7-octene-1-sulfonyl fluoride) copolymer.

17. The method of claim 13, wherein the sweep gas is air.

18. The method of claim 13, wherein the sweep gas is maintained at a temperature of 100° C. or less.

19. The method of claim 13, wherein a sufficient amount of water is transported through the membrane to increase the concentration of the aqueous hydrogen peroxide solution to at least 75% by volume at temperatures of less than 30° C.

20. The method of claim 13, wherein a sufficient amount of water is transported through the membrane to increase the concentration of the aqueous hydrogen peroxide solution to at least 85% by volume at temperatures of less than 75° C.

* * * * *